Dec. 13, 1949 G. M. ASHTON 2,491,357
WRECKING TRUCK HOIST MECHANISM
Filed Feb. 16, 1948 2 Sheets-Sheet 1
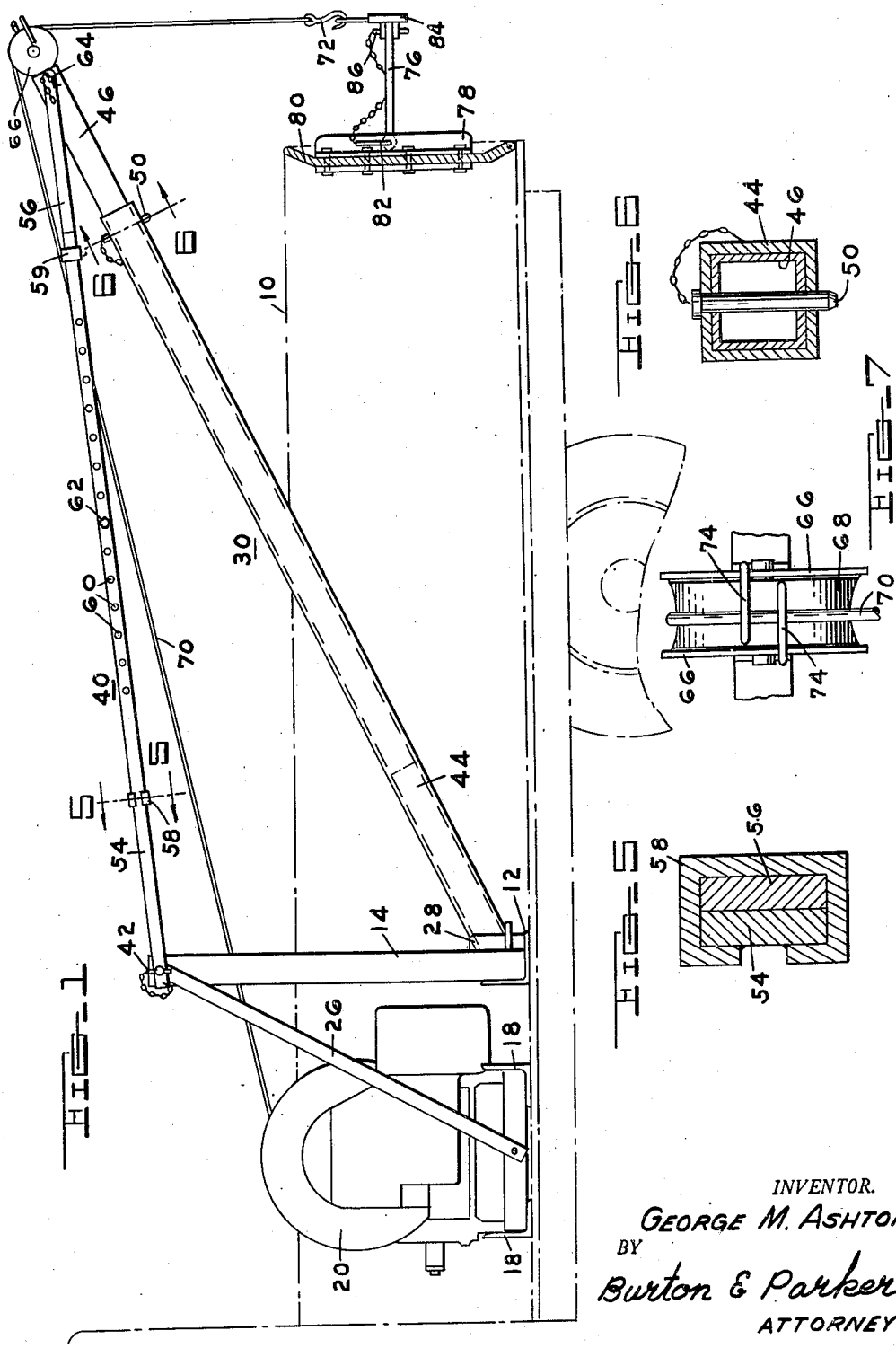
INVENTOR.
GEORGE M. ASHTON
BY
Burton & Parker
ATTORNEYS Dec. 13, 1949 G. M. ASHTON 2,491,357
WRECKING TRUCK HOIST MECHANISM
Filed Feb. 16, 1948 2 Sheets-Sheet 2
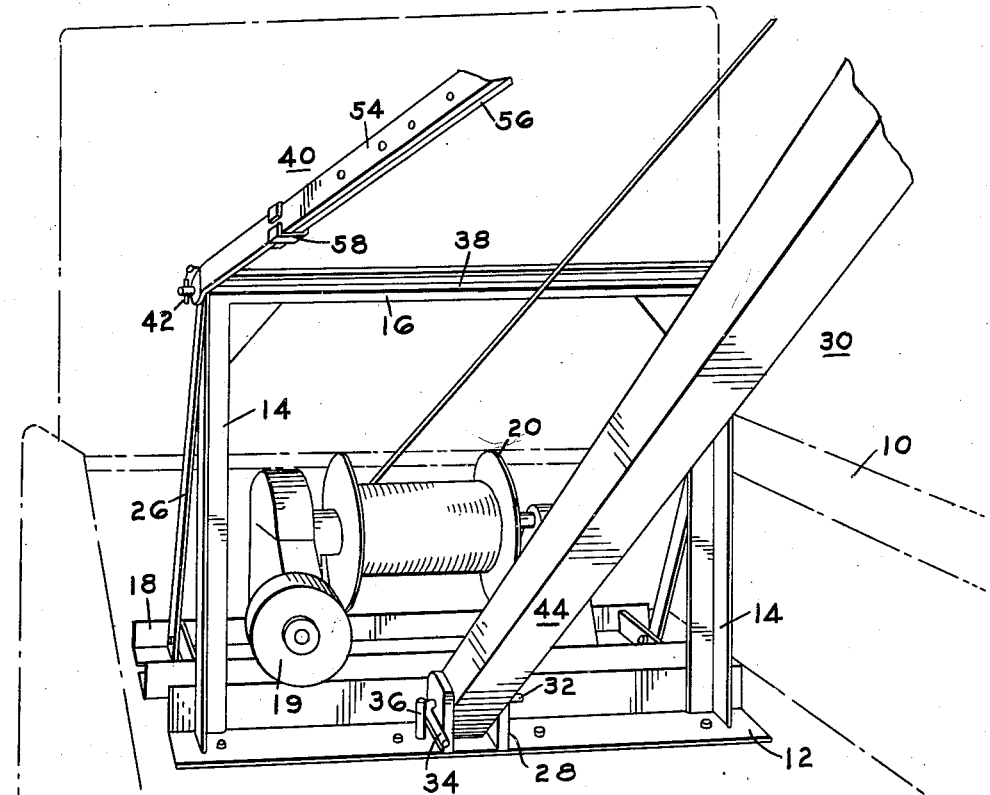
INVENTOR.
GEORGE M. ASHTON
BY
Burton & Parker
ATTORNEYS Patented Dec. 13, 1949

2,491,357

UNITED STATES PATENT OFFICE 2,491,357

WRECKING TRUCK HOIST MECHANISM

George M. Ashton, Detroit, Mich., assignor to Ashton Power Wrecker Equipment Co. Inc., Detroit, Mich., a corporation of Michigan Application February 16, 1948, Serial No. 8,501

1 Claim. (Cl. 214—86)

This invention relates to improvements in wrecker car hoist mechanism.

An object is to provide improved hoist or crane mechanism for a wrecker or a tow car which mechanism is particularly adapted for use on a small truck, such as a three-quarter or a one-ton truck, and which mechanism is adapted to be readily mounted for use on the truck or dismounted to clear the floor of the vehicle body for other uses. Such vehicles are widely used by small service stations, contractors, farmers, and the like, and my improved hoist mechanism is capable of lifting and supporting for towing one end of a motor vehicle, or of lifting other structures.

A further object is to provide mechanism of the character described which is adapted to be sold as a separate unit and mounted by the purchaser within a body of a standard small-size truck and wherein the boom assembly is adjustably extensible to fit different length bodies and to cooperate with tow bar mechanism mounted on the tail gate of the body.

An improved feature of my invention is that it includes an upright framework which constitutes a structural unit with the winch assembly and is preferably fixed within the vehicle body closely adjacent to the driver's cab so that the portion of the body to the rear of this framework may be cleared for load-carrying purposes by dismounting the articulated parts of the boom.

Meritorious advantages are believed to reside in the specific provision for extensibly adjusting the boom structure and for mounting and dismounting the same and in the means provided to retain the hoist cable upon the pulley wheel and to remove the same therefrom.

Other features and advantages will more fully appear from the following description, claim and accompanying drawing wherein:

Fig. 1 is a side elevation of wrecker hoist mechanism embodying my invention mounted within the body of a motor vehicle schematically illustrated in part in dotted outline.

Fig. 2 is a perspective of a fragment of the base of such hoist mechanism mounted in the body of a motor vehicle.

Fig. 3 is a perspective of the tail gate of a vehicle body carrying cooperating linkage for towing illustrated in association with the hoist mechanism in Fig. 1.

Fig. 4 is a plan of the outer end of the hoist mechanism looking down thereon and showing the boom supporting links in section.

Fig. 5 is a cross sectional view taken on the line 5—5 of Fig. 1.

Fig. 6 is a cross-sectional view taken on the line 6—6 of Fig. 1, and

Fig. 7 is an end elevation of the pulley and of the boom.

The hoist mechanism of this invention is wrecker hoist mechanism adapted to be mounted within a vehicle body. A small truck is the type of vehicle commonly used as a tow car and wrecker car by small service stations. Such a vehicle body is indicated schematically in dotted outline by the numeral 10 in Figs. 1, 2 and 3 of the drawing. This hoist mechanism is mounted upon the floor of the body of such a vehicle adjacent to the cab portion as appears in Fig. 2.

There is a base member 12 shown as an angular section which carries a pair of upright standards 14 connected at the top by a cross piece 16. There is a base 18 which supports a winch 20 which winch may be driven by power mechanism conventionally indicated as 19 which forms no part of the invention. A pair of brace members 26 are secured at their lower ends to the base of the winch and at their upper ends to the upright standards 14 as shown in Figs. 1 and 2.

The base 12 of the frame is provided with a pair of mounting plates 28 and a boom assembly 30 is pivoted at its lower end between such plates upon an angular pivot pin 32. The end 34 of the pin is adapted to be held in place by an upright stud 36 as shown in Fig. 2 when such end is swung to the position shown in Fig. 2 but the pin may be withdrawn by swinging the end 34 into the upright position so as to clear the stud 36.

A rod 38 extends between the upright standards 14 and projects at its ends therethrough and therebeyond and each projecting end portion is adapted to serve as a pivot mounting for a link 40. A retaining pin 42 is adapted to be received through the end of the rod to hold the link thereon. The two links 40 and the boom assembly 30 are made up of telescoping inner and outer end sections.

The inner end section of the boom which is specifically designated as 44 is pivoted as hereinabove described upon the pin 32. Such inner end section is illustrated as being in the form of a tube which is rectangular in cross section. The outer end section 46 is likewise formed of a tube which is rectangular in cross section. This outer end section is telescoped into the outer end of the inner end section 44 as shown particularly in Figs. 1 and 6. The two end sections 44 and 46 are provided with a plurality of registering apertures 48 and the pin 50 is adapted to be received through such apertures to lock the two end sections of the boom together at adjusted telescoped positions.

The two links 40 are likewise formed of overlapping sections which are adjustable lengthwise with respect to each other. Each link assembly, which is indicated at numeral 40, consists of an inner end section 54 and an outer end section 56. These two sections are held together by a pair of clamping straps 58 and 59. The inner end section 54 is journaled upon the projecting end of the rod 38 and held thereon by pin 42 as shown in Figs. 1 and 2. The outer end section 56 is pivotally coupled with the outer end section 46 of the boom by a pin 64 as illustrated particularly in Fig. 4. A cotter pin 65 may be received through the free end of the pin 64.

Clamping strap 58 is shown in detail in Fig. 5. This particular strap is welded or otherwise secured to the inner link section 54. Strap 59 is correspondingly secured to the outer link section 56. These straps hold the two link sections together so that they may be adjusted with respect to each other. These two sections are provided with a series of registering apertures 60 and a retaining pin 62 is provided to maintain the two sections at adjusted positions.

The outer end of the boom is provided with a pulley assembly comprising a frame having a pair of side plates 66 between which is pivoted a pulley frame 68 over which travels a cable 70 which cable is wound upon the winch 20. The outer end of the cable may be provided with a hook 72. Each side plate 66 of the pulley frame is provided with a finger 74. These fingers overlap each other as shown particularly in Fig. 7 but are spaced apart as there shown so that the cable might be threaded therebetween for removal from the pulley.

A short tongue member 76 is pivoted between a pair of plates 78 on the rear face of the tail gate 80 as shown in Figs. 1 and 3. A pivot pin 82 extends through the inner end of the tongue and through the plates 78 as shown in Fig. 1. This lastly described mechanism is a mechanism which cooperates with the hoist device but itself constitutes a part of the draw bar connection extending between the towing vehicle and a vehicle which may be towed.

What I claim is:

In a vehicle truck body, an upright substantially rectangular framework supported upon the floor of the body, a winch mounted upon a base supported upon the floor of the body adjacent to said framework, braces extending from the winch base to the top of the framework, said framework having a base provided with a pivotal support for a boom assembly and having a top portion provided with a pair of laterally spaced apart pivotal supports for boom supporting links, a boom detachably removably pivoted at its inner end on the pivotal support therefor on the base, a pair of links detachably removably pivoted at their inner ends to the two pivotal supports at the top of the framework and pivotally articulated at their outer ends with the outer end of the boom and a cable wound upon the winch and extending outwardly over the pulley, said boom consisting of an inner end portion and an outer end portion, said portions telescopically articulated together, each of said boom supporting links consisting of an inner end portion and an outer end portion, said portions telescopically articulated together.

GEORGE M. ASHTON.

REFERENCES CITED

The following references are of record in the file of this patent:

UNITED STATES PATENTS

| Number | Name | Date |
|---|---|---|
| 1,522,684 | Howard | Jan. 13, 1925 |
| 1,629,592 | Staley | May 24, 1927 |
| 1,783,189 | Green | Dec. 2, 1930 |
| 2,283,443 | Klein | May 19, 1942 |
| 2,290,384 | Rowe | July 21, 1942 |